(12) United States Patent
Bai et al.

(10) Patent No.: US 12,513,677 B2
(45) Date of Patent: Dec. 30, 2025

(54) TECHNIQUES FOR USING BEAMS IN MULTIPLE TRANSPORT BLOCK SCHEDULING

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/936,376

(22) Filed: Sep. 28, 2022

(65) Prior Publication Data

US 2023/0106376 A1 Apr. 6, 2023

Related U.S. Application Data

(60) Provisional application No. 63/251,105, filed on Oct. 1, 2021.

(51) Int. Cl.
*H04W 72/044* (2023.01)
*H04W 72/20* (2023.01)

(52) U.S. Cl.
CPC ......... *H04W 72/046* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2010/0135237 A1* | 6/2010 | Papasakellariou | H04W 72/04 455/450 |
| 2010/0232373 A1* | 9/2010 | Nory | H04W 72/23 370/329 |

(Continued)

FOREIGN PATENT DOCUMENTS

| | | | | |
|---|---|---|---|---|
| CN | 113826334 A | * | 12/2021 | ......... H04B 7/06956 |
| CN | 114982190 A | * | 8/2022 | ............ H04L 5/001 |

(Continued)

OTHER PUBLICATIONS

International Search Report and Written Opinion—PCT/US2022/045246—ISA/EPO—Dec. 22, 2022.

*Primary Examiner* — Andrew C Oh
(74) *Attorney, Agent, or Firm* — Paul M. McAdams; Procopio, Cory, Hargreaves & Savitch LLP

(57) ABSTRACT

Aspects described herein relate to receiving control information that schedules multiple data transmissions to be received by a user equipment (UE), receiving a first data transmission of the multiple data transmissions using, based on whether the first data transmission is scheduled to be received before or after a threshold time, one of a first beam identified in the control information or a first default beam, where the threshold time is a time offset from a time at which the control information is received, and receiving a second data transmission of the multiple data transmissions using one of the first beam identified in the control information, a second beam identified in the control information, or a second default beam. Other aspects relate to transmitting the control information, the first data transmission, and the second data transmission.

28 Claims, 7 Drawing Sheets

(56) References Cited

U.S. PATENT DOCUMENTS

| | | | | |
|---|---|---|---|---|
| 2018/0343653 | A1* | 11/2018 | Guo | H04B 7/088 |
| 2019/0053162 | A1* | 2/2019 | Islam | H04W 52/0216 |
| 2019/0373450 | A1* | 12/2019 | Zhou | H04L 5/0023 |
| 2020/0145998 | A1* | 5/2020 | Sun | H04W 72/23 |
| 2020/0229169 | A1* | 7/2020 | John Wilson | H04W 24/10 |
| 2020/0322109 | A1* | 10/2020 | Yu | H04B 7/022 |
| 2020/0344791 | A1* | 10/2020 | Park | H04B 7/0695 |
| 2020/0351892 | A1* | 11/2020 | Yi | H04W 72/53 |
| 2020/0396685 | A1* | 12/2020 | Nam | H04W 16/28 |
| 2021/0014848 | A1* | 1/2021 | Davydov | H04W 72/23 |
| 2021/0058113 | A1* | 2/2021 | Jung | H04B 7/088 |
| 2021/0058930 | A1* | 2/2021 | Zhou | H04W 24/10 |
| 2021/0084624 | A1* | 3/2021 | Zhou | H04W 72/0446 |
| 2021/0105749 | A1* | 4/2021 | Zhou | H04L 5/0023 |
| 2021/0112560 | A1* | 4/2021 | Khoshnevisan | H04W 72/23 |
| 2021/0112561 | A1* | 4/2021 | Zhou | H04B 7/024 |
| 2021/0135741 | A1* | 5/2021 | Zhou | H04B 7/024 |
| 2021/0152230 | A1* | 5/2021 | Josan | H04L 5/001 |
| 2021/0152235 | A1* | 5/2021 | Zhou | H04B 7/088 |
| 2021/0153217 | A1* | 5/2021 | Zhou | H04W 24/08 |
| 2021/0184812 | A1* | 6/2021 | MolavianJazi | H04W 72/044 |
| 2021/0195508 | A1* | 6/2021 | Zhang | H04W 48/16 |
| 2021/0195570 | A1* | 6/2021 | Zhang | H04L 5/0048 |
| 2021/0258942 | A1* | 8/2021 | Bai | H04L 5/001 |
| 2021/0258964 | A1 | 8/2021 | Khoshnevisan et al. | |
| 2021/0385807 | A1* | 12/2021 | Rahman | H04B 7/06968 |
| 2022/0007347 | A1* | 1/2022 | Zhou | H04B 7/0404 |
| 2022/0022235 | A1* | 1/2022 | Khoshnevisan | H04L 1/1896 |
| 2022/0077998 | A1* | 3/2022 | Raghavan | H04W 72/23 |
| 2022/0086658 | A1* | 3/2022 | Zhang | H04L 5/0051 |
| 2022/0095350 | A1* | 3/2022 | Lee | H04W 74/0833 |
| 2022/0248406 | A1* | 8/2022 | Zhang | H04B 7/0695 |
| 2022/0312382 | A1* | 9/2022 | Bai | H04W 72/044 |
| 2022/0312485 | A1* | 9/2022 | Zhang | H04W 72/0453 |
| 2022/0322113 | A1* | 10/2022 | Zhang | H04B 7/088 |
| 2023/0141660 | A1* | 5/2023 | Matsumura | H04W 16/28 370/329 |
| 2023/0379936 | A1* | 11/2023 | Matsumura | H04B 7/0639 |
| 2024/0015666 | A1* | 1/2024 | Yuan | H04W 52/365 |
| 2024/0032027 | A1* | 1/2024 | Yuan | H04L 5/0053 |
| 2024/0089861 | A1* | 3/2024 | Yuan | H04B 7/0639 |
| 2024/0129933 | A1* | 4/2024 | Matsumura | H04L 5/0094 |
| 2024/0154651 | A1* | 5/2024 | Bai | H04B 7/0417 |
| 2024/0267193 | A1* | 8/2024 | Yuan | H04W 72/232 |

FOREIGN PATENT DOCUMENTS

| | | | | |
|---|---|---|---|---|
| CN | 115053604 A | * | 9/2022 | H04B 7/0617 |
| CN | 115053614 A | * | 9/2022 | H04L 5/0035 |
| CN | 116584058 A | * | 8/2023 | H04W 72/231 |
| CN | 117015947 A | * | 11/2023 | H04W 72/1268 |
| CN | 117044342 A | * | 11/2023 | H04W 72/04 |
| CN | 114765784 B | * | 1/2025 | H04L 5/0053 |
| EP | 3820052 A1 | | 5/2021 | |
| EP | 4280738 A1 | * | 11/2023 | H04L 5/0053 |
| KR | 20220166815 A | * | 12/2022 | H04L 5/0053 |
| KR | 20230091188 A | * | 6/2023 | H04L 5/0098 |
| WO | WO-2013140526 A1 | * | 9/2013 | H04W 76/40 |
| WO | WO-2017192889 A1 | * | 11/2017 | H04W 72/21 |
| WO | WO-2018210243 A1 | * | 11/2018 | H04W 16/28 |
| WO | WO-2019099659 A1 | * | 5/2019 | H04W 72/53 |
| WO | WO-2019219162 A1 | * | 11/2019 | H04W 72/53 |
| WO | WO-2020145794 A1 | * | 7/2020 | H04L 5/0094 |
| WO | WO-2021012845 A1 | * | 1/2021 | H04B 7/088 |
| WO | WO-2021087845 A1 | * | 5/2021 | H04B 7/0695 |
| WO | WO-2021092583 A1 | * | 5/2021 | H04B 17/318 |
| WO | WO-2021160689 A1 | * | 8/2021 | H04B 7/06966 |
| WO | WO-2021187823 A1 | * | 9/2021 | H04B 7/0697 |
| WO | WO-2022147659 A1 | * | 7/2022 | H04W 72/04 |
| WO | WO-2022149272 A1 | * | 7/2022 | H04W 88/02 |

* cited by examiner

TECHNIQUES FOR USING BEAMS IN MULTIPLE TRANSPORT BLOCK SCHEDULING

CROSS REFERENCE TO RELATED APPLICATION(S)

This application claims the benefit of and priority to U.S. Provisional Application Ser. No. 63/251,105, entitled "TECHNIQUES FOR USING BEAMS IN MULTIPLE TRANSPORT BLOCK SCHEDULING" and filed on Oct. 1, 2021, which is expressly incorporated by reference herein in its entirety.

BACKGROUND

Aspects of the present disclosure relate generally to wireless communication systems, and more particularly, to communicating in a wireless network using a beam.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, a node can schedule a user equipment (UE) for communications therewith, by transmitting control information indicating resources over which to communicate with the UE. In one example, a base station can transmit, to a UE, downlink control information to schedule multiple data channel occasions over which to receive multiple transport blocks of downlink communications from the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication performed by a user equipment (UE) is provided that includes receiving control information that schedules multiple data transmissions to be received by the UE, receiving a first data transmission of the multiple data transmissions using, based on whether the first data transmission is scheduled to be received before or after a threshold time, one of a first beam identified in the control information or a first default beam, where the threshold time is a time offset from a time at which the control information is received, and receiving a second data transmission of the multiple data transmissions using one of the first beam identified in the control information, a second beam identified in the control information, or a second default beam.

In another aspect, a method of wireless communication performed by a node is provided that includes transmitting control information that schedules multiple data transmissions to be received by a UE, transmitting a first data transmission of the multiple data transmissions using, based on whether the first data transmission is scheduled to be transmitted before or after a threshold time, one of a first beam identified in the control information or a first default beam, where the threshold time is a time offset from a time at which the control information is transmitted, and transmitting a second data transmission of the multiple data transmissions using one of the first beam identified in the control information, a second beam identified in the control information, or a second default beam.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
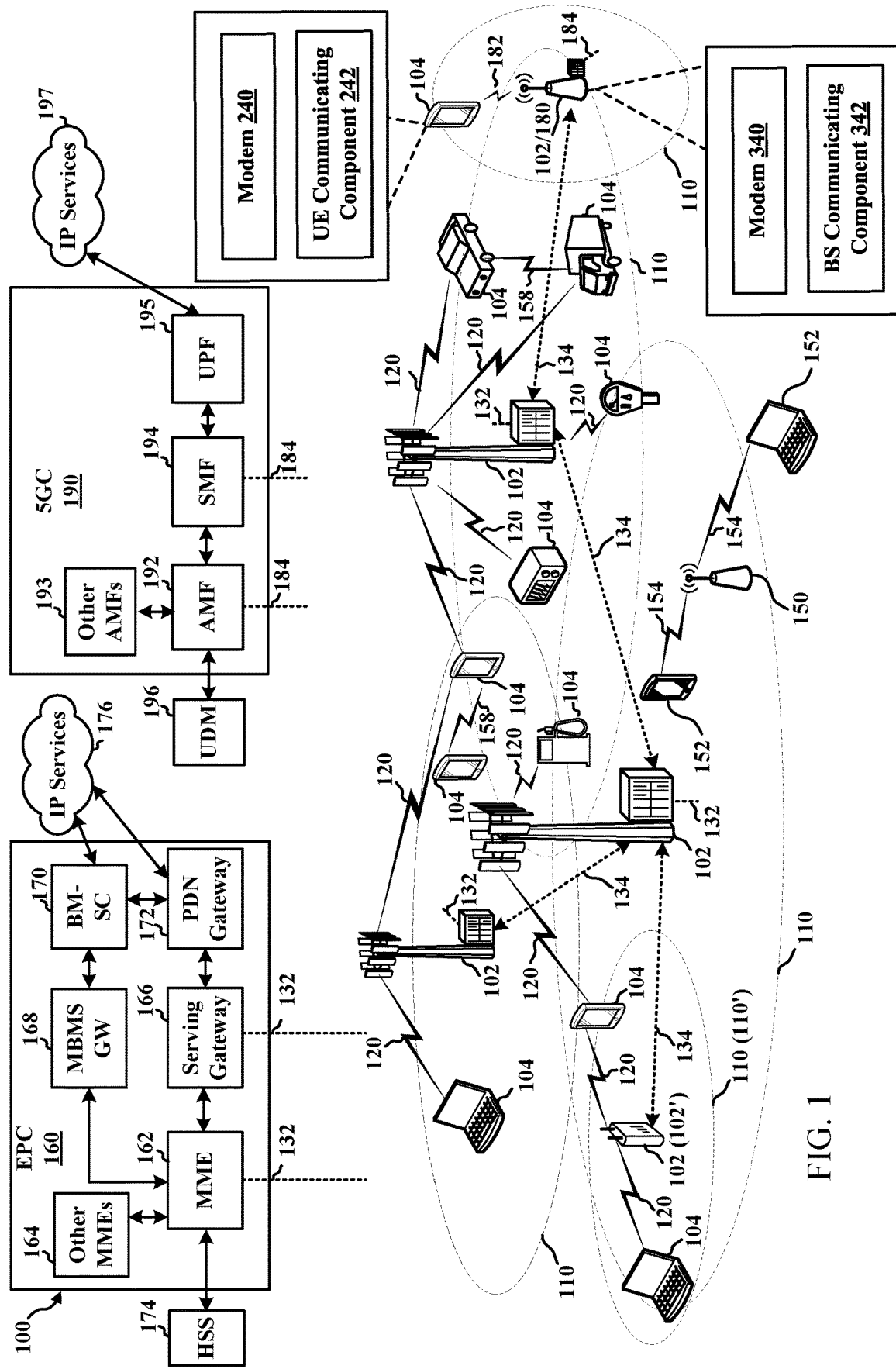
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using beams for communications scheduled as multiple transport blocks (TBs). For example, in some wireless communication technologies, including third generation partnership project (3GPP) technologies such as fifth generation (5G) new radio (NR), etc., a user equipment (UE) or other device can be scheduled to receive multiple data channel transmissions including multiple TBs. For example, a base station can transmit, to the UE, a single downlink control information (DCI) (e.g., in a physical downlink control channel (PDCCH)) that schedules multiple data channel (e.g., physical downlink shared channel (PDSCH)) opportunities to receive different TBs, which may be located in different time divisions. Scheduling multiple data channel opportunities in different slots can save signaling overhead associated with DCI, reduce a need of frequent PDCCH monitoring for DCI, reduce data channel buffering due to PDCCH decoding delay, etc.

In some wireless communication technologies, a time division may include a transmission time interval (TTI), which may be or include a slot including a varying or fixed number of symbols (e.g., orthogonal frequency division multiplexing (OFDM) symbols, single carrier-frequency division multiplexing (SC-FDM) symbols, etc.), a subframe of a fixed duration in time (e.g., 1 millisecond) that includes a collection of symbols, a symbol or collection of multiple symbols, etc. In this regard, in one example, a single DCI can schedule multiple PDSCH occasions for multiple TBs in different slots.

When a time offset between DCI and any scheduled PDSCH is larger than a threshold (which may be based on UE capability), then the indicated beam in the DCI can be applied for each of the PDSCH. In some instances, the DCI may indicate multiple TCI states for different PDSCHs or corresponding slots. Aspects described herein relate to communicating using a beam (or transmission configuration indicator (TCI) state) for each of the scheduled PDSCHs or corresponding slots based on whether the time offset between DCI and a scheduled PDSCH is smaller than the threshold. In one aspect, the same beam (or TCI state) can be used for all scheduled PDSCHs. In another aspect, different beams (or TCI states) can be used for different PDSCHs or corresponding slots, and may be individually determined. Additional aspects described herein relate to determining beams (or TCI state) to use when scheduled PDSCHs are in different component carriers (CCs), which may have different subcarrier spacing (SCS).

In 3GPP Release 15, which may not support a single DCI scheduling multiple TB s, when the time offset between DCI and its scheduled DCI is smaller than a threshold, time-ForQCLduration, a default beam can be used for the scheduled PDSCH, where the default beam may be associated with a lowest control resource set (CORESET) identifier (ID) of a latest monitored slot. As different CORESETs can be monitored in different slots, the default beam may not be fixed across slots. In 3GPP Release 16, where up to two transmission/reception points (TRPs) can be supported per cell, the default beam can be based on whether multiple DCIs (mDCI) are provided for scheduling PDSCHs over the multiple TRPs or whether a single DCI (sDCI) is provided for scheduling PDSCHS over the multiple TRPs. Where mDCI is provided, CORESETs can be divided into two pools, each labeled with a CORESETPOOLindex, and each pool corresponding to one TRP. In this case, PDCCH for each CORESET pool can schedule PDSCH from the same TRP, and the default beam for each TRP can be the beam of the lowest CORESET ID from the same pool in the latest slot when any CORESET in the pool is monitored—thus, the default beam can vary across slots. Where sDCI is provided, a TCI codepoint, including up to two TCI states, is defined, where each TCI state corresponds to a beam from a TRP. In this case, the default beam pairs from two TRPs can be the lowest ID active TCI codepoint that has two TCI states—thus the default beams do not vary over slots due to changes of monitored CORESETs.

Communicating using a beam (or TCI state) for each of the scheduled PDSCHs or corresponding slots based on whether the time offset between DCI and a scheduled PDSCH is smaller than the threshold, as described herein, can allow for predictable beam determination and/or usage in wireless communications. This can improve quality of communications by increasing signal strength at least as received at the UE. This can also result in conserving communication resources, and accordingly improve user experience when using the UE.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for communicating multiple data transmissions scheduled by a single control information based on one or more beams, in accordance with aspects described herein. In addition, some nodes may have a modem 340 and BS communicating component 342 for configuring a UE for communicating multiple data transmissions scheduled by a single control information based on one or more beams, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein. In some aspects, a node may refer to a UE. In other aspects, a node may refer to a base station. For example, a first node may be configured to communicate with a second node and a third node. In such an example, each respective node of the first node, second node, and third node may be a respective UE or a respective base station. As one example, the first node may be a UE, the second node may be a base station, and the third node may be a base station. As another example, the first node may be a UE, the second node may be a UE, and the third node may be a base station. As another example, the first node may be a base station, the second node may be a UE, and the third node may be a base station. Similarly, a node may also be referred to as a network entity, a telecommunications node, a processing system, an apparatus, or the like.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station (e.g., gNB 180) may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can receive, from a BS communicating component 342, a single control information (e.g., a single DCI) scheduling multiple data transmissions (e.g., multiple PDSCH opportunities to receive multiple different TBs). In this example, UE communicating component 242 can use a beam for receiving each of the multiple data transmissions, and may, in some examples, use a different beam for receiving different ones of the multiple data transmissions. For example, where at least one of the multiple data transmissions is received before a threshold time for the UE 104 to process the DCI, UE communicating component 242 can use a default beam to receive the at least one of the multiple data transmissions. In one example, UE communicating component 242 can use the same default beam or a different beam to receive other ones of the multiple data transmissions that are received after the threshold time (e.g., a beam identified in DCI for the other ones of the multiple data transmissions). BS communicating component 342, in an example, can similarly use the same or different beams in transmitting the multiple transmissions.

Though the concepts described above and further herein are generally explained for downlink transmissions from a base station 102 to a UE 104, similar functionalities can be applied by a sidelink transmitting UE in transmitting sidelink communications to a sidelink receiving UE, where the sidelink transmitting UE can include the functions of the BS communicating component 342 and the sidelink receiving UE can include the functions of the UE communicating component 242.

Figure 2:
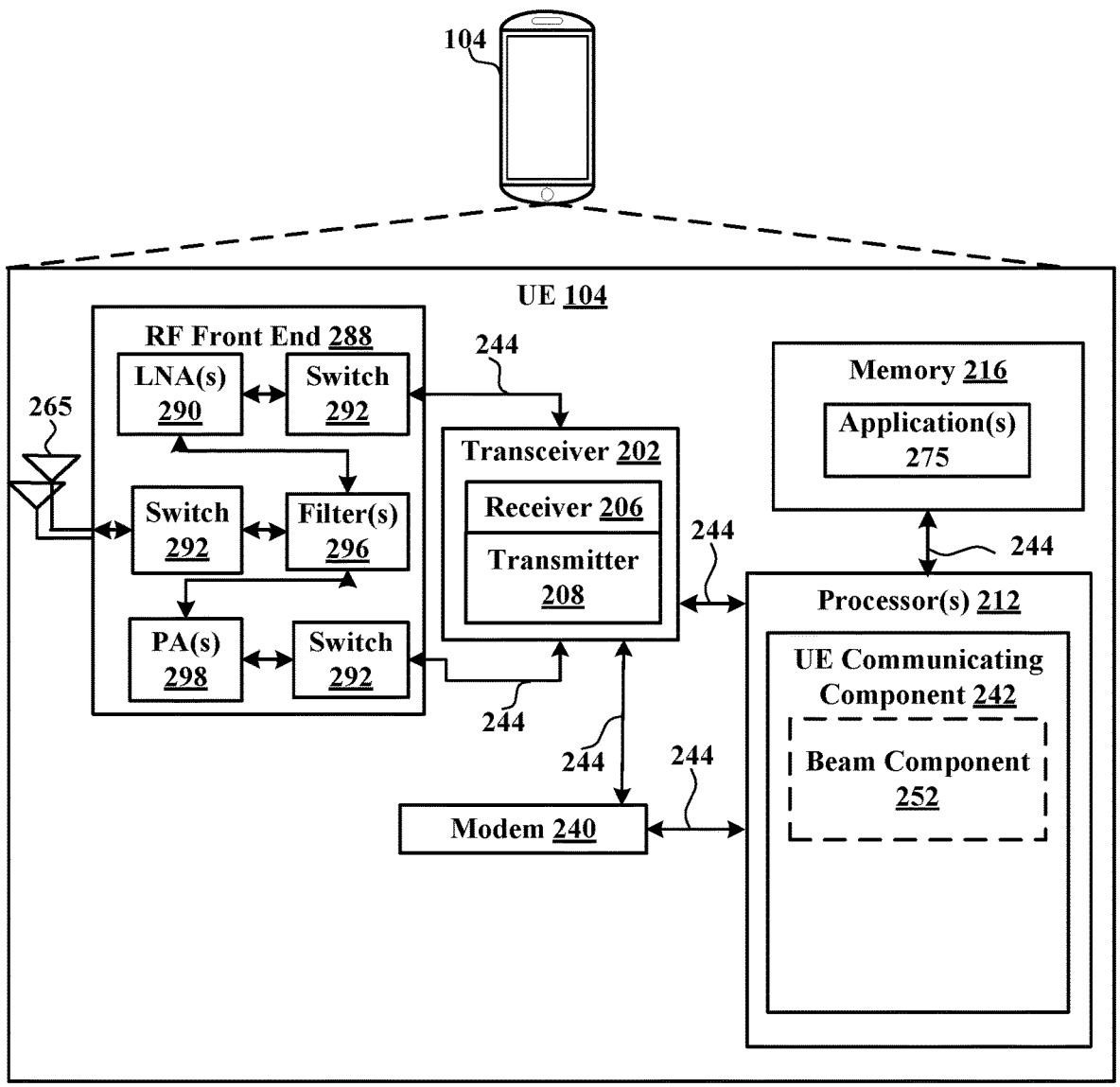
FIG. 2 is a block diagram illustrating an example of a user equipment (UE), in accordance with various aspects of the present disclosure.
Figure 3:
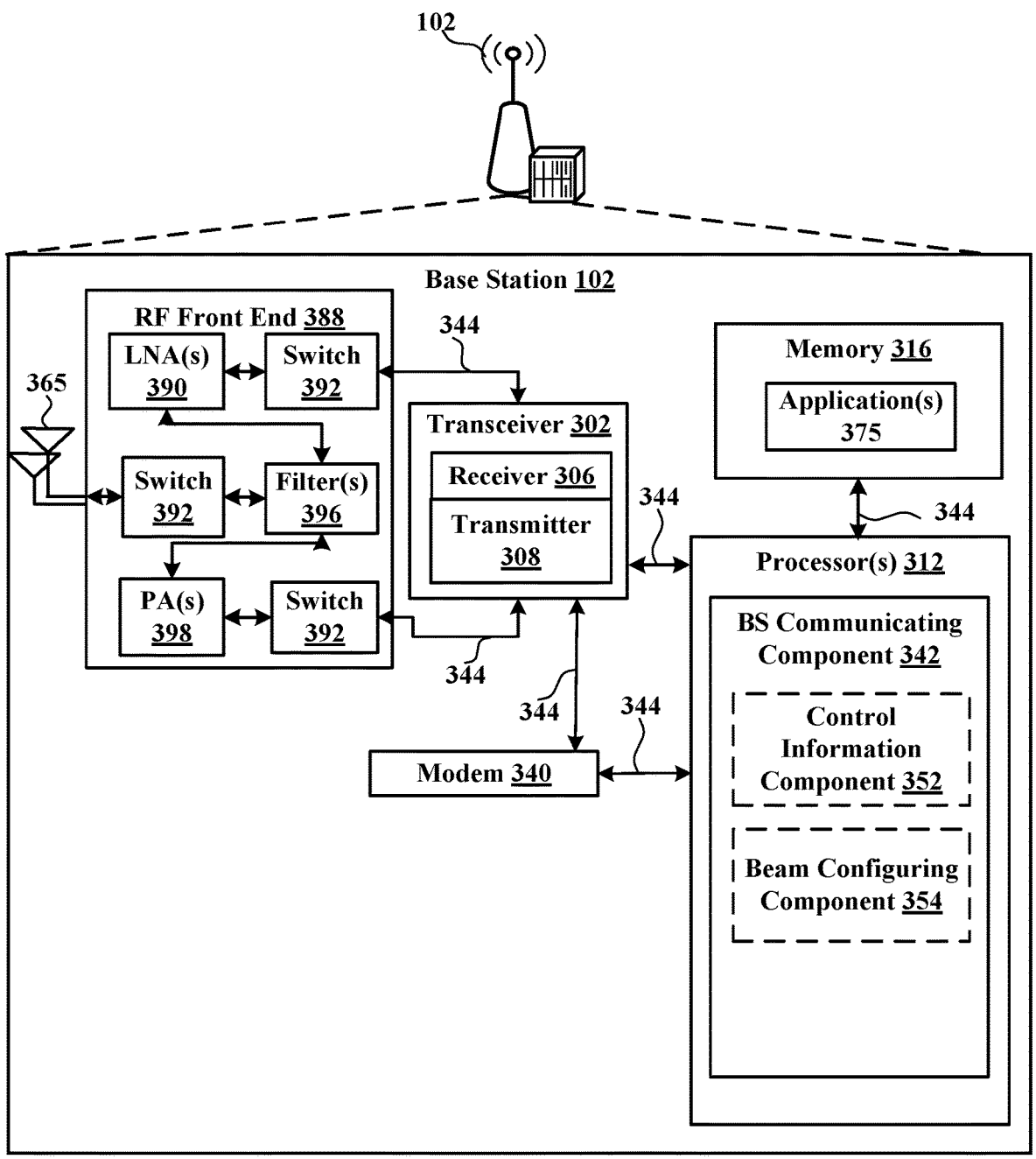
FIG. 3 is a block diagram illustrating an example of a base station, in accordance with various aspects of the present disclosure.
Figure 4:
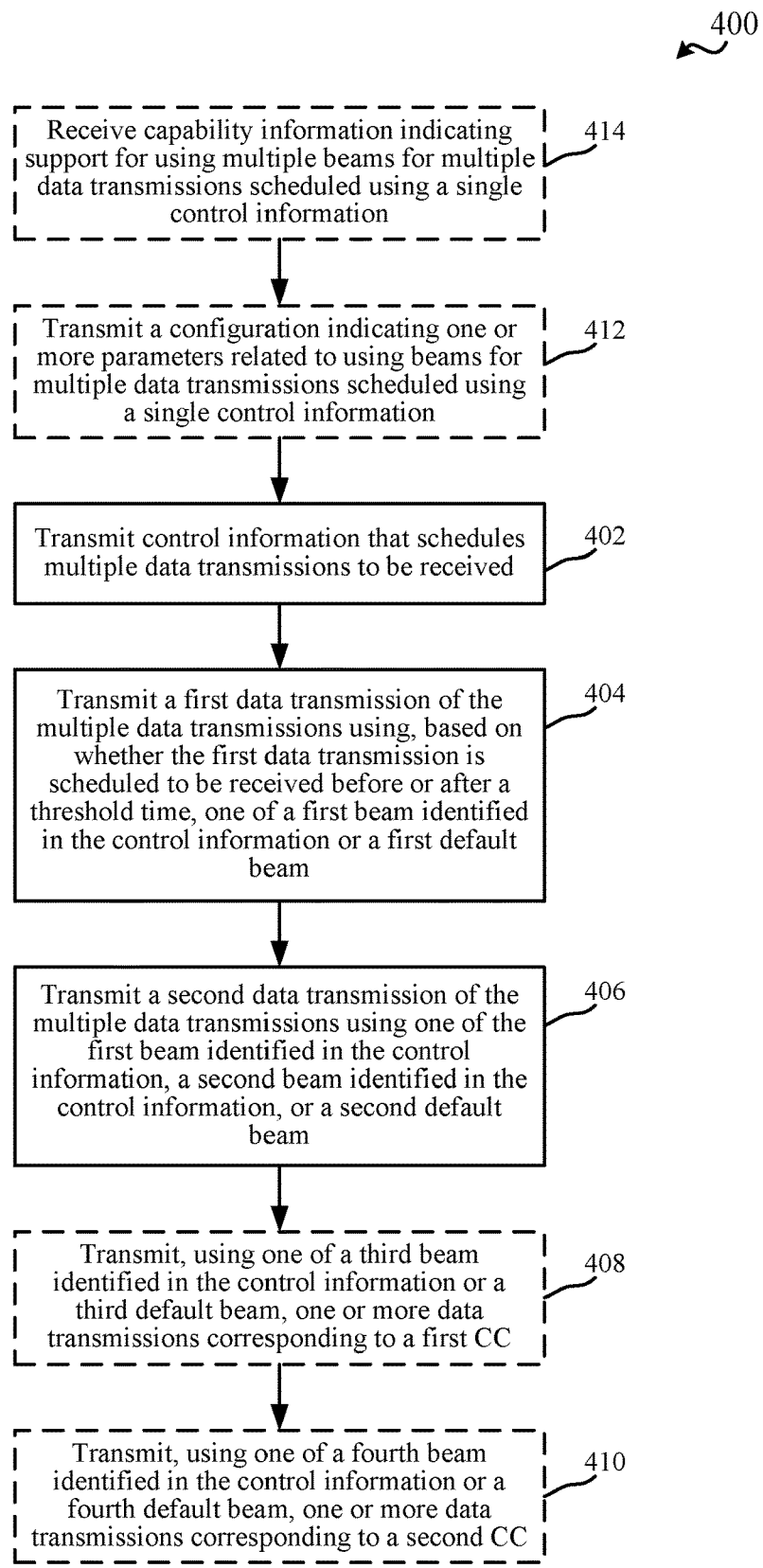
FIG. 4 is a flow chart illustrating an example of a method for configuring a UE to receive, using one or more beams, multiple data transmissions scheduled by a single control information, in accordance with aspects described herein.
Figure 5:
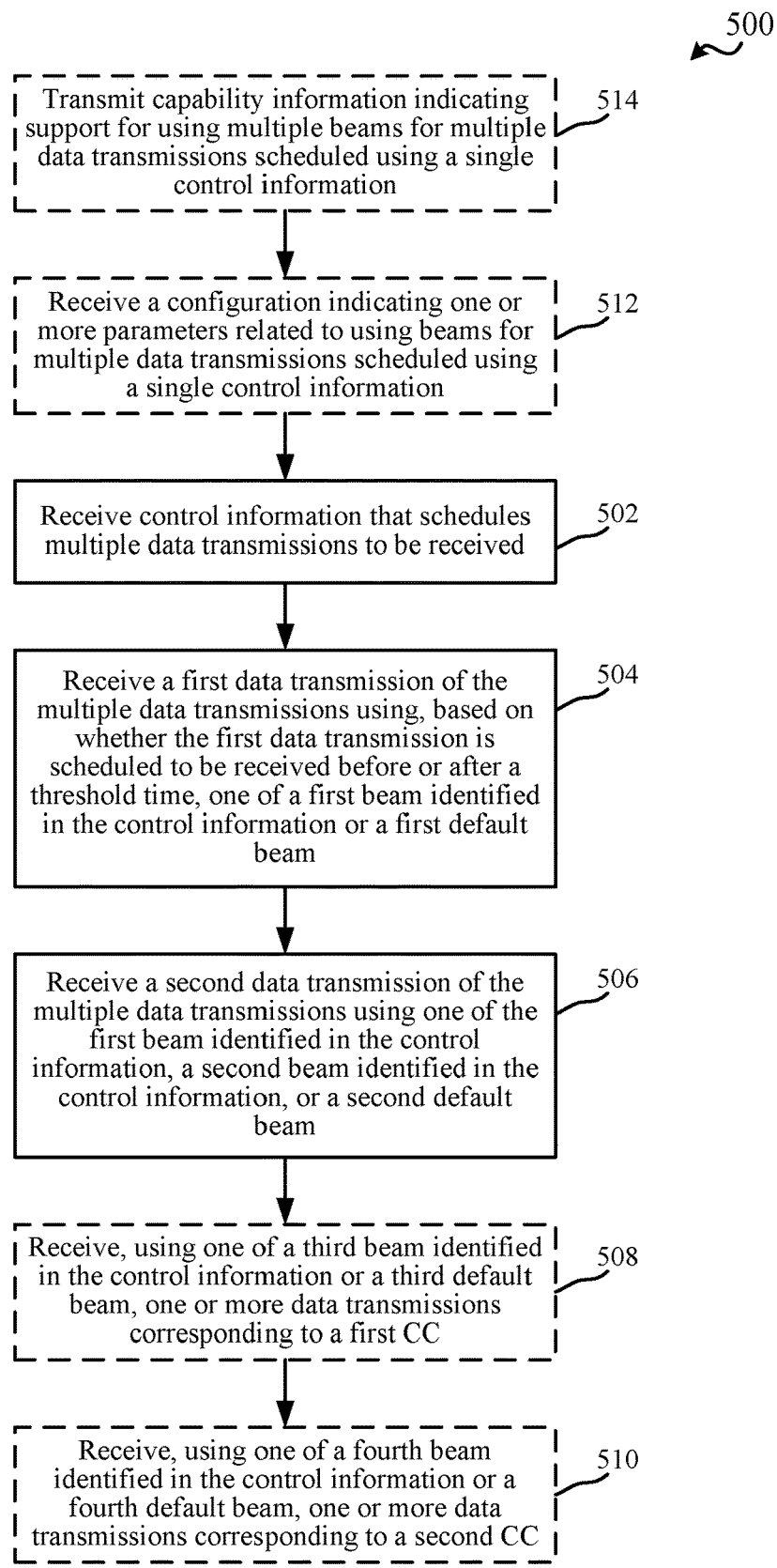
FIG. 5 is a flow chart illustrating an example of a method for receiving, using one or more beams, multiple data transmissions scheduled by a single control information, in accordance with aspects described herein.

Turning now to FIGS. 2-7, aspects are depicted with reference to one or more components and one or more methods that may perform the actions or operations described herein. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for communicating multiple data transmissions scheduled by a single control information based on one or more beams, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may include, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can include a beam component 252 for using and/or determining a beam to use in receiving multiple data transmissions of different TBs scheduled by a single control information, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for configuring a UE for communicating multiple data transmissions scheduled by a single control information based on one or more beams, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can include a control information component 352 for communicating control information to one or more UEs, and/or a beam configuring component 354 for configuring a UE to use a beam in receiving multiple data transmissions of different TBs scheduled by a single control information, and/or for using or determining to use the beam in transmitting the multiple data transmissions to the UE, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for configuring a UE to receive, using one or more beams, multiple data transmissions scheduled by a single control information, in accordance with aspects described herein. FIG. 5 illustrates a flow chart of an example of a method 500 for receiving, using one or more beams, multiple data transmissions scheduled by a single control information, in accordance with aspects described herein. Methods 400 and 500 are described in conjunction with one another below simply for ease of explanation, though the methods are not required to be performed in conjunction with one another, and indeed different nodes can perform either of method 400 or 500. In an example, a base station 102 or other node (e.g., a sidelink UE) can perform the functions described in method 400 using one or more of the components described in FIGS. 1 and 3, and a UE 104 or other receiving node (e.g., a sidelink receiving UE) can perform the functions described in method 500 using one or more of the components described in FIGS. 1 and 2.

In method 400, at Block 402, control information that schedules multiple data transmissions to be received can be transmitted. In an aspect, control information component 352, e.g., in conjunction with processor(s) 312, memory 316, transceiver 302, BS communicating component 342, etc., can transmit (e.g., to a UE 104) control information that schedules multiple data transmissions to be received (e.g., from the base station 102). For example, control information component 352 can generate and use a single DCI to schedule multiple data transmissions (e.g., PDSCH transmissions) of different TBs in multiple slots. In one example, the DCI can indicate a beam to use in receiving the multiple data transmissions from the base station 102. For example, the DCI can indicate a TCI state configured for the UE 104, which the UE 104 can use to determine the corresponding beam for receiving the multiple data transmissions. For example, the DCI can indicate a single beam to use for the multiple data transmissions, a specific beam to use for each of the multiple data transmissions, which may be the same beam or different beam for each of the multiple data transmissions, etc.

In method 500, at Block 502, control information that schedules multiple data transmissions to be received can be received. In an aspect, UE communicating component 242, e.g., in conjunction with processor(s) 212, memory 216, transceiver 202, etc., can receive (e.g., from a base station 102) control information that schedules multiple data transmissions to be received (e.g., from the base station 102). For example, as described above, the control information can include a single DCI that schedules multiple PDSCH transmissions of different TB s in multiple slots and/or may indicate one or more beams to use in receiving the PDSCH transmissions in the multiple slots. Where the DCI indicates a TCI state, beam component 252 can configure a beam to use in receiving the PDSCH transmissions based on a previously configured set of TCI states (e.g., configured via RRC signaling) and an index in the DCI indicating which of the configured set of TCI states to use.

In method 400, at Block 404, a first data transmission of the multiple data transmissions can be transmitted using, based on whether the first data transmission is scheduled to be received before or after a threshold time, one of a first beam identified in the control information or a first default beam. In an aspect, BS communicating component 342, e.g., in conjunction with processor(s) 312, memory 316, transceiver 302, etc., can transmit the first data transmission of the multiple data transmissions using, based on whether the first data transmission is scheduled to be received before or after the threshold time, one of the first beam identified in the control information or the first default beam. For example, BS communicating component 342 can use, determine, or configure the default beam based on various considerations regarding a first time division (e.g., slot) during which the first data transmission is transmitted, or a last time division (e.g., slot), monitored by the UE 104, before that during which the first data transmission is transmitted.

In method 500, at Block 504, a first data transmission of the multiple data transmissions can be received using, based on whether the first data transmission is scheduled to be received before or after a threshold time, one of a first beam identified in the control information or a first default beam. In an aspect, UE communicating component 242, e.g., in conjunction with processor(s) 212, memory 216, transceiver 202, etc., can receive the first data transmission of the multiple data transmissions using, based on whether the first data transmission is scheduled to be received before or after the threshold time, one of the first beam identified in the control information or the first default beam. Similarly, UE communicating component 242 can use or determine the default beam based on various considerations regarding a first time division (e.g., slot) during which the first data transmission is received, or a last monitored time division (e.g., slot) before that during which the first data transmission is received.

In method 400, at Block 406, a second data transmission of the multiple data transmissions can be transmitted using one of the first beam identified in the control information, a second beam identified in the control information, or a second default beam. In an aspect, BS communicating component 342, e.g., in conjunction with processor(s) 312, memory 316, transceiver 302, etc., can transmit the first data transmission of the multiple data transmissions using one of the first beam identified in the control information, the second beam identified in the control information, or the second default beam, which may be the same or different than the first default beam. In an example, whether to use the first beam identified in the control information, the second beam identified in the control information, or the second default beam may be based on whether the first data transmission is scheduled to be transmitted before or after the threshold time, as described above and further herein. In another example, where the second default beam is different than the first default beam, BS communicating component 342 can use, determine, or configure the second default beam based on various considerations regarding a second time division (e.g., slot) during which the second data transmission is transmitted, or a last time division (e.g., slot), monitored by the UE 104, before that during which the second data transmission is transmitted.

In method 500, at Block 506, a second data transmission of the multiple data transmissions can be received using one of the first beam identified in the control information, a second beam identified in the control information, or a second default beam. In an aspect, UE communicating component 242, e.g., in conjunction with processor(s) 212, memory 216, transceiver 202, etc., can receive the first data transmission of the multiple data transmissions using one of the first beam identified in the control information, the second beam identified in the control information, or the second default beam, which may be the same or different than the first default beam. In an example, whether to use the first beam identified in the control information, the second beam identified in the control information, or the second default beam may be based on whether the first data transmission is scheduled to be received before or after the threshold time, as described above and further herein. In another example, where the second default beam is different than the first default beam, UE communicating component 242 can use or determine the second default beam based on various considerations regarding a second time division (e.g., slot) during which the second data transmission is received, or a last monitored time division (e.g., slot) before that during which the second data transmission is received.

In one example, where the first data transmission is received before the threshold time, UE communicating component 242 can use the first default beam to receive at least the first data transmission (and/or BS communicating component 342 can use the first default beam to transmit at least the first data transmission). In one example, UE communicating component 242 can use the first default beam to receive all of the data transmissions scheduled by the single DCI regardless of whether they are received after the threshold time at least the first data transmission (and/or BS communicating component 342 can use the first default beam to transmit all of the data transmission scheduled by the single DCI). In another example, UE communicating component 242 can use the beam indicated in DCI for data transmission(s) that are scheduled to be received after the threshold (and/or BS communicating component 342 can use beam indicated in DCI for data transmission(s) that are scheduled to be transmitted after the threshold).

Figure 6:
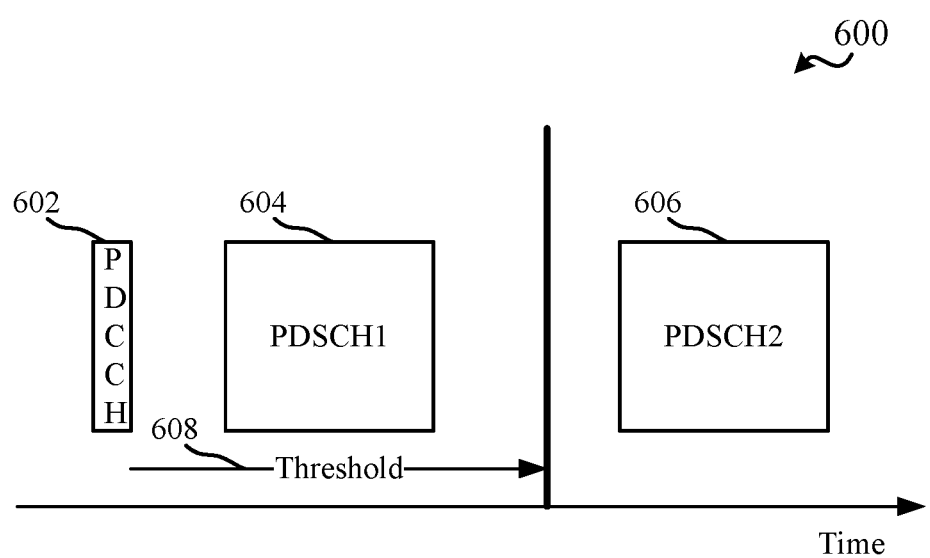
FIG. 6 illustrates an example of a timeline for data transmissions, in accordance with aspects described herein.

An example is shown in FIG. 6, which illustrates a timeline 600 for PDSCH data transmissions. In timeline 600, PDCCH 602 is transmitted including a single DCI for scheduling PDSCH1 604 and PDSCH2 606. The DCI can include an indication of a beam for PDSCH1 604 and PDSCH2 606, whether this is a single beam for all PDSCHs, individually indicated beams for each PDSCH, etc. As PDSCH1 604 is scheduled to be received before threshold time 608, at least PDSCH1 604 can be transmitted and/or received using a default beam. In one example, based on PDSCH1 604 being scheduled to be received before threshold time 608, all PDSCHs scheduled by the DCI, including PDSCH2 606, can be transmitted and/or received using the default beam. In another example, based on PDSCH2 606 being scheduled to be received after threshold time 608, at least PDSCH2 606 can be transmitted and/or received using the beam indicated in the DCI for PDSCH2.

In one example, where the default beam is used for all data transmissions (e.g., where the first default beam and second default beam are the same default beam and where the first default beam is used for the first data transmission and the second default beam is used for the second data transmission), beam component 252, and/or beam configuring component 354, can use or identify the default beam based on a rule. In one example, beam component 252 can receive, and/or beam configuring component 354 can configure or transmit, information that identifies the first default beam and/or the second default beam. For example, this information may include specific configuration of the beams or other information described herein from which the first default beam and/or second default beam can be derived.

In another example, in this case, beam component 252, and/or beam configuring component 354, can use or identify the default beam based on a particular time division (e.g., slot) including the scheduled data transmission (e.g., an earliest slot including one of the multiple data transmissions). In this example, the CC of the multiple data transmissions may be the same, and the CC may be configured with CORESETs, which may each indicate a beam (or associated TCI state). In one example, where the multiple data transmissions correspond to a single TRP, beam component 252, and/or beam configuring component 354, can use or identify the default beam for all data transmissions as a beam associated with the CORESET having a lowest CORESET ID of CORESETs in a last slot monitored by the UE 104 before the earliest data transmission of the multiple data transmissions (e.g., before PDSCH1 604 in FIG. 6). In another example, where the multiple data transmissions correspond to multiple TRPs and multiple DCIs schedule data transmissions for multiple TRPs, beam component 252, and/or beam configuring component 354, can use or identify the default beam for all data transmissions as a beam associated with a CORESET having a lowest CORESET ID of CORESETs from the same CORESET pool as the latest slot when any CORESET in the pool is monitored by the UE 104 before the earliest data transmission of the multiple data transmissions.

In yet another example, where the multiple data transmissions correspond to multiple TRPs and a single DCI schedules data transmissions for multiple TRPs, beam component 252, and/or beam configuring component 354, can use or identify the default beam for all data transmissions based on default beam pairs indicated in the lowest identifier of active TCI state codepoint for a data transmission that has TCI states for each TRP (e.g., two TCI states for two TRPs). In yet another example, where the CC is not configured with a CORESET, beam component 252, and/or beam configuring component 354, can use or identify the default beam for all data transmissions based on default beam (pairs) indicated in the lowest identifier of active TCI state codepoint for data transmissions. The active TCI state codepoint can refer to a list of TCI state identifiers that are activated from a list of previously configured TCI state information. The lower identifier of active TCI state codepoints can be the TCI state identifier at a first codepoint (e.g., codepoint 0).

In one example, where different data transmissions scheduled by the same DCI can use different beams, data transmissions scheduled to be received after the threshold time can use the beam indicated in the DCI for the data transmissions. In this example, data transmissions scheduled to be received before the threshold time can use a default beam, which may be the same default beam for the data transmissions or can be different or otherwise individually identified for each of the data transmissions scheduled to be received before the threshold time. In this example, beam component 252, and/or beam configuring component 354, can accordingly use or identify the appropriate beam for each downlink transmission as described further in the following examples. In one example, beam component 252 can receive, and/or beam configuring component 354 can configure or transmit, information that identifies the first default beam and/or the second default beam. For example, this information may include specific configuration of the beams or other information described herein from which the first default beam and/or second default beam can be derived. For example, each default beam can be associated with a CORESET identifier identified for respective data transmissions.

For example, for multiple data transmissions scheduled to be received (or transmitted) before the threshold time, beam component 252, and/or beam configuring component 354, can use or identify the default beam for each of the first default beam and the second default beam as similarly described above where the same beam is used for all data transmissions. For example, beam component 252, and/or beam configuring component 354, can use or identify each default beam based on a particular time division (e.g., slot) including a given data transmission scheduled to be received (or transmitted) before the threshold time. In this example, the CC of the multiple data transmissions may be the same, and the CC may be configured with CORESETs, which may each indicate a beam (or associated TCI state). In one example, where the multiple data transmissions correspond to a single TRP, beam component 252, and/or beam configuring component 354, can use or identify a first default beam for a first data transmission, scheduled to be received (or transmitted) before the threshold time, as a beam associated with the CORESET having a lowest CORESET ID of CORESETs in a last slot monitored by the UE 104 before the first data transmission. Similarly, in this example, beam component 252, and/or beam configuring component 354, can use or identify a second default beam for a second data transmission (or other beams for other data transmissions), scheduled to be received (or transmitted) before the threshold time, as a beam associated with the CORESET having a lowest CORESET ID of CORESETs in a last slot monitored by the UE 104 before the second data transmission (or other data transmission).

In another example, where the multiple data transmissions correspond to multiple TRPs and multiple DCIs schedule data transmissions for multiple TRPs, beam component 252, and/or beam configuring component 354, can use or identify a first default beam for a first data transmission, scheduled to be received (or transmitted) before the threshold time, as a beam associated with a CORESET having a lowest CORESET ID of CORESETs from the same CORESET pool as the latest slot when any CORESET in the pool is monitored by the UE 104 before the first data transmission. Similarly, in this example, beam component 252, and/or beam configuring component 354, can use or identify a second default beam for a second data transmission (or other default beams for other data transmissions), scheduled to be received (or transmitted) before the threshold time, as a beam associated with a CORESET having a lowest CORESET ID of CORESETs from the same CORESET pool as the latest slot when any CORESET in the pool is monitored by the UE 104 before the second data transmission (or other data transmission).

In yet another example, where the multiple data transmissions correspond to multiple TRPs and a single DCI schedules data transmissions for multiple TRPs, beam component 252, and/or beam configuring component 354, can use or identify a first default beam for a first data transmission, scheduled to be received before the threshold time, based on default beam pairs indicated in the lowest identifier of active TCI state codepoint for the first data transmission (e.g., for a slot associated with the first data transmission) that has TCI states for each TRP (e.g., two TCI states for two TRPs). For example, MAC-CE may indicate different active TCI states per slot, and the TCI state with the lowest identifier for the slot corresponding to the data transmission (or last monitored before the data transmission) can be assigned as the default beam for that data transmission. Similarly, in this example, beam component 252, and/or beam configuring component 354, can use or identify a second default beam for a second data transmission (or other default beams for other data transmissions), scheduled to be received before the threshold time, based on default beam pairs indicated in the lowest identifier of active TCI state codepoint for the second data transmission (or other data transmissions) that has TCI states for each TRP (e.g., two TCI states for two TRPs).

In yet another example, where the CC is not configured with a CORESET, beam component 252, and/or beam configuring component 354, can use or identify a first default beam for a first data transmission, scheduled to be received before the threshold time, based on default beam (pairs) indicated in the lowest identifier of active TCI state codepoint for the first data transmission. Similarly, in this example, beam component 252, and/or beam configuring component 354, can use or identify a second default beam for a second data transmission (or other default beams for other data transmission), scheduled to be received before the threshold time, based on default beam (pairs) indicated in the lowest identifier of active TCI state codepoint for the second data transmission (or other data transmissions).

In another example, the single DCI may schedule data transmissions in multiple different CCs, which may have different SCSs and thus may also have different threshold times. In method 400, at Block 408, one or more data transmissions corresponding to a first CC can be transmitted using one of a third beam identified in the control information or a third default beam. In an aspect, BS communicating component 342, e.g., in conjunction with processor(s) 312, memory 316, transceiver 302, etc., can transmit, using one of the third beam identified in the control information or the third default beam (or the first beam or second beam identified in the control information), the one or more data transmissions corresponding to the first CC. In method 400, at Block 410, one or more data transmissions corresponding to a second CC can be transmitted using one of a fourth beam identified in the control information or a fourth default beam. In an aspect, BS communicating component 342, e.g., in conjunction with processor(s) 312, memory 316, transceiver 302, etc., can transmit, using one of the fourth beam identified in the control information or the fourth default beam (or the first beam or second beam or third beam identified in the control information), the one or more data transmissions corresponding to the second CC.

In method 500, at Block 508, one or more data transmissions corresponding to a first CC can be received using one of a third beam identified in the control information or a third default beam. In an aspect, UE communicating component 242, e.g., in conjunction with processor(s) 212, memory 216, transceiver 202, etc., can receive, using one of the third beam identified in the control information or the third default beam (or the first beam or second beam identified in the control information), the one or more data transmissions corresponding to the first CC. In method 500, at Block 510, one or more data transmissions corresponding to a second CC can be received using one of a fourth beam identified in the control information or a fourth default beam. In an aspect, UE communicating component 242, e.g., in conjunction with processor(s) 212, memory 216, transceiver 202, etc., can receive, using one of the fourth beam identified in the control information or the fourth default beam (or the first beam or second beam or third beam identified in the control information), the one or more data transmissions corresponding to the second CC.

In one example, the data transmissions corresponding to the first CC and/or the data transmissions corresponding to the second CC may include the first data transmission and/or the second data transmission described above. In one example, beam component 252, and/or beam configuring component 354, can use or identify beams individually for different CCs (e.g., the third beam, the third default beam, the fourth beam and/or the fourth default beam, which may be along with the first beam, the first default beam, the second beam and/or the second default beam, as described above) using one or more of the examples described above. In another example, beam component 252, and/or beam configuring component 354, can use or identify a common beam for data transmissions in different CCs (or all CCs) that are scheduled at the same or similar times. Where beam component 252, and/or beam configuring component 354, use a common beam for data transmissions in all CCs, if at least one data transmission is scheduled to be received before the threshold time for its corresponding CC, beam component 252, and/or beam configuring component 354, can use or identify the common beam as a default beam for the CC having the earliest data transmission in time. In this example, beam component 252, and/or beam configuring component 354, can use or identify the default beam based on one or more of the options described above. Where more than one CC has an earliest data transmission, beam component 252, and/or beam configuring component 354, can use or identify the default beam from one of the more than on CC based on a rule. The rule, for example, may include using the CC with a lowest identifier, using the CC with a smallest tone spacing, or using the CC with the latest monitored CORESET.

In another example, beam component 252, and/or beam configuring component 354, can use or identify a common beam for data transmissions of multiple CCs scheduled to be received (or transmitted) at a same (or overlapping) time, but may use or identify different beams for data transmissions across time divisions (e.g., slots). In this example, beam component 252, and/or beam configuring component 354, can individually use or identify a beam for each data transmission. For data transmissions scheduled to be received (or transmitted) in a same or overlapping time division (e.g., slot), beam component 252, and/or beam configuring component 354, can use or identify a common beam for the data transmissions using a rule. As described above, for example, the rule may include using the CC with a lowest identifier, using the CC with a smallest tone spacing, or using the CC with the latest monitored CORESET.

In method 400, at Block 412, a configuration indicating one or more parameters related to using beams for multiple data transmissions scheduled using a single control information can be transmitted. In an aspect, BS communicating component 342, e.g., in conjunction with processor(s) 312, memory 316, transceiver 302, etc., can transmit the configuration indicating the one or more parameters related to using beams for multiple data transmissions scheduled using the single control information. For example, the one or more parameters can indicate which of the above examples or options that UE 104 can use, or is to use, in determining a beam for a given data transmission from the base station 102. For example, the one or more parameters can relate to, or can indicate, using the same beam for all data transmissions, or individually determining the beams for each data transmission (e.g., based on whether the data transmission is received before or after the threshold time, etc.). In an example, BS communicating component 342 can transmit the configuration to the UE 104 in radio resource control (RRC) signaling, update in media access control-control element (MAC-CE), etc.

In another example, the configuration can indicate whether the UE 104 is to follow either the enhanced PDSCH default beam and QCL rule for multi-PDSCH scheduling for 3GPP Release 17, as described herein, or the corresponding 3GPP Release 15/16 rule, as described above. For example, the configuration can be in the form of a RRC parameter introduced separately for single TRP communications, multiple TRP communications scheduled by a single DCI, and multiple TRP communications scheduled by multiple DCIs. For example, the base station 102 can configure in RRC to UE to down-select a rule from multiple rules to determine TCI states for the multi-PDSCHs, including 3GPP Release 17 rules (e.g., the rules described herein) or legacy 3GPP Release 15/16 rule, as described above. The configuration can be per scenario, e.g., separately for single TRP communications, multiple TRP communications scheduled by a single DCI, and multiple TRP communications scheduled by multiple DCIs.

In method 500, at Block 512, a configuration indicating one or more parameters related to using beams for multiple data transmissions scheduled using a single control information can be received. In an aspect, UE communicating component 242, e.g., in conjunction with processor(s) 212, memory 216, transceiver 202, etc., can receive the configuration indicating one or more parameters related to using beams for multiple data transmissions scheduled using a single control information. UE communicating component 242 can receive the data transmissions based on beams that can be determined, at least in part, based on the one or more parameters indicated in the configuration, as described.

In method 400, at Block 414, capability information indicating support for using multiple beams for multiple data transmissions scheduled using a single control information can be received. In an aspect, BS communicating component 342, e.g., in conjunction with processor(s) 312, memory 316, transceiver 302, etc., can receive the capability information indicating support for using multiple beams for multiple data transmissions scheduled using the single control information. For example, the capability information can include an indication of which of the above examples or options that UE 104 supports for determining a beam for a given data transmission. In an example, BS communicating component 342 can accordingly transmit data transmissions using beams based on the capability information for the UE 104. In another example, the capability information may indicate whether the UE 104 supports different beams for different CCs at a time, how many beams at a time are supported, etc. In this example, BS communicating component 342 can accordingly transmit data transmissions using multiple beams for multiple CCs based on the capability information for the UE 104.

In method 500, at Block 514, capability information indicating support for using multiple beams for multiple data transmissions scheduled using a single control information can be transmitted. In an aspect, UE communicating component 242, e.g., in conjunction with processor(s) 212, memory 216, transceiver 202, etc., can transmit the capability information indicating support for using multiple beams for multiple data transmissions scheduled using a single control information. As described above, the capability information can indicate which of the above examples or options that UE 104 supports for determining a beam for a given data transmission and/or can indicate whether the UE 104 supports different beams for different CCs at a time, how many beams at a time are supported, etc. The BS communicating component 342 can transmit, and the UE communicating component 242 can accordingly receive, data transmissions using beams based on the indicated capability.

Figure 7:
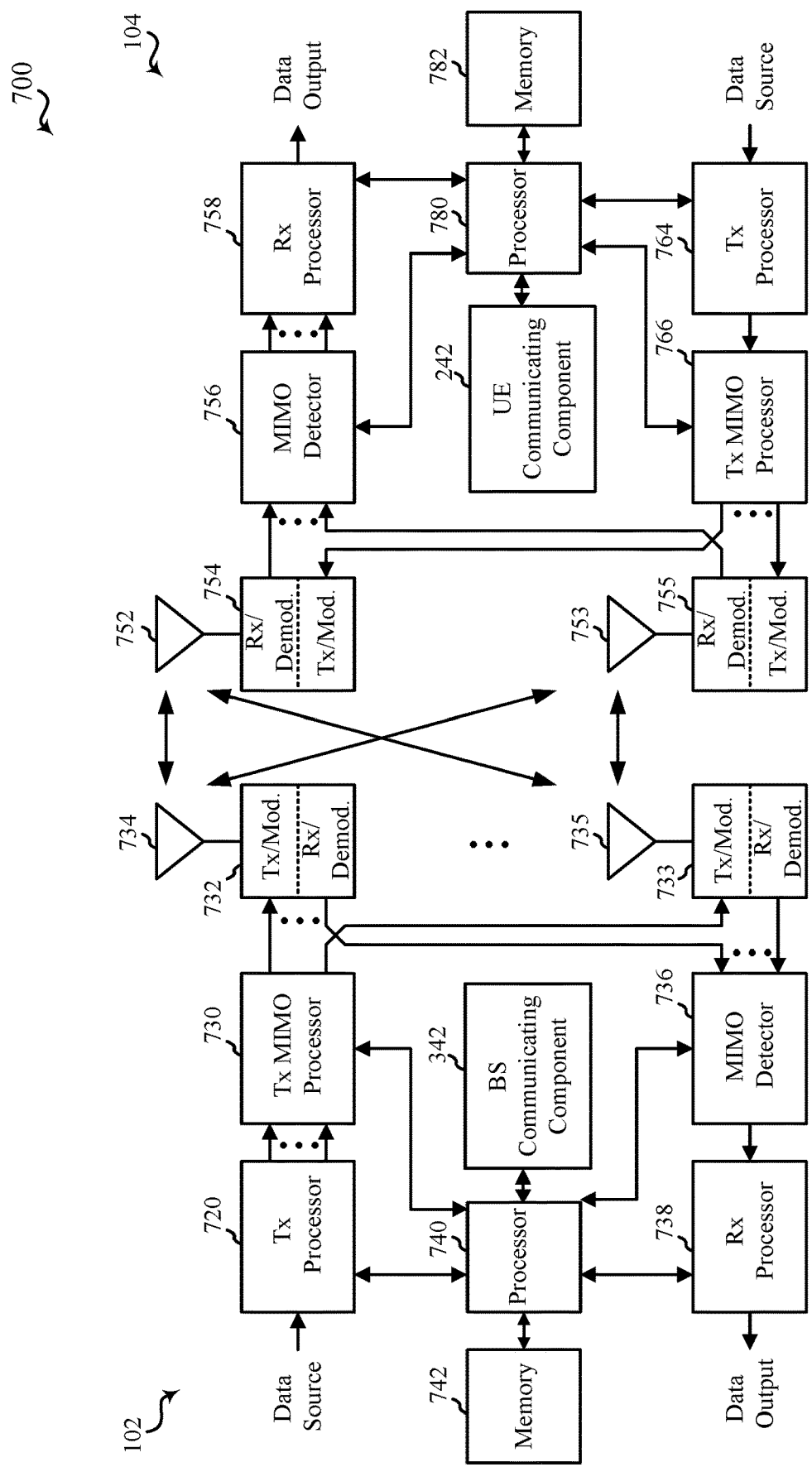
FIG. 7 is a block diagram illustrating an example of a multiple-input multiple-output (MIMO) communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a UE communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method of wireless communication performed by a UE including receiving control information that schedules multiple data transmissions to be received by the UE, receiving a first data transmission of the multiple data transmissions using, based on whether the first data transmission is scheduled to be received before or after a threshold time, one of a first beam identified in the control information or a first default beam, where the threshold time is a time offset from a time at which the control information is received, and receiving a second data transmission of the multiple data transmissions using one of the first beam identified in the control information, a second beam identified in the control information, or a second default beam.

In Aspect 2, the method of Aspect 1 includes where receiving the second data transmission using one of the first beam identified in the control information, the second beam identified in the control information, or the second default beam is based on whether the first data transmission is scheduled to be received before or after the threshold time.

In Aspect 3, the method of any of Aspects 1 or 2 includes where the first default beam is based on when the first data transmission is scheduled to be received relative to the threshold time, where the second default beam is the same as the first default beam.

In Aspect 4, the method of any of Aspects 1 to 3 includes where the first default beam is associated with a control resource set (CORESET) identifier, where the second default beam is the same as the first default beam.

In Aspect 5, the method of any of Aspects 1 to 4 includes where the first default beam is associated with a lowest CORESET identifier corresponding to a latest monitored slot scheduled to be received before the first data transmission, where the second default beam is the same as the first default beam.

In Aspect 6, the method of any of Aspects 1 to 5 includes where the control information schedules the multiple data transmissions from multiple transmission/reception points, where the first data transmission and the control information are associated with a CORESET pool, where the first default beam is associated with a first lowest CORESET identifier in the CORESET pool, and where the second default beam is the same as the first default beam.

In Aspect 7, the method of any of Aspects 1 to 6 includes receiving information that identifies the first default beam and the second default beam.

In Aspect 8, the method of any of Aspects 1 to 7 includes receiving information that identifies a respective default beam for each respective CORESET identifier associated with the multiple data transmissions.

In Aspect 9, the method of Aspect 8 includes where the first default beam is associated with a first CORESET identifier associated, and where the second default beam is associated with a second CORESET identifier.

In Aspect 10, the method of any of Aspects 1 to 9 includes where the control information schedules the multiple data transmissions from multiple transmission/reception points, and further comprising identifying the first default beam and the second default beam based on a beam pair corresponding to a transmission configuration indicator (TCI) codepoint having a lowest index for the first data transmission, where the second default beam is the same as the first default beam.

In Aspect 11, the method of any of Aspects 1 to 10 includes where, where a CORESET is not configured for a component carrier (CC) corresponding to the multiple data transmissions, the first default beam corresponds to a transmission configuration indicator (TCI) codepoint having a lowest index for the first data transmission, where the second default beam is the same as the first default beam.

In Aspect 12, the method of any of Aspects 1 to 11 includes where receiving the second data transmission using one of the first beam identified in the control information, the second beam identified in the control information, or the second default beam is based on whether the second data transmission is scheduled to be received before or after the threshold time.

In Aspect 13, the method of any of Aspects 1 to 12 includes receiving, using the first beam identified in the control information, each respective data transmission of the multiple data transmissions that is scheduled to be received after the threshold time.

In Aspect 14, the method of any of Aspects 1 to 13 includes where the second default beam is the same as the first default beam.

In Aspect 15, the method of Aspect 14 includes receiving, using the first default beam, each respective data transmission of the multiple data transmissions that is scheduled to be received before the threshold time.

In Aspect 16, the method of any of Aspects 1 to 15 includes receiving, using the first default beam or the second default beam, each respective data transmission of the multiple data transmissions that is scheduled to be received before the threshold time, where the second default beam is different from the first default beam.

In Aspect 17, the method of any of Aspects 1 to 16 includes where the second default beam is based on when the second data transmission is scheduled to be received relative to the threshold time, where the second default beam is different than the first default beam.

In Aspect 18, the method of any of Aspects 1 to 17 includes where the first default beam is associated with a first lowest CORESET identifier in a first latest monitored slot before the first data transmission is scheduled to be received, and where the second default beam is associated with a second lowest CORESET identifier in a second latest monitored slot before the second data transmission is scheduled to be received.

In Aspect 19, the method of any of Aspects 1 to 18 includes where the control information schedules the multiple data transmissions from multiple transmission/reception points, where the first data transmission and the control information are associated with a first CORESET pool, where the first default beam is associated with a first lowest CORESET identifier in the CORESET pool in a first latest monitored slot before the first data transmission is scheduled to be received, where the second default beam is associated with a second lowest CORESET identifier in the CORESET pool in a second latest monitored slot before the second data transmission is scheduled to be received.

In Aspect 20, the method of any of Aspects 1 to 19 includes where the first default beam and the second default beam are indicated in a configuration received from a base station that identifies default beams for each of multiple CORESET pool identifiers.

In Aspect 21, the method of any of Aspects 1 to 20 includes where the control information schedules the multiple data transmissions from multiple transmission/reception points, where the first default beam is based on a beam pair corresponding to a transmission configuration indicator (TCI) codepoint having a lowest index corresponding to the first data transmission, and where the second default beam is based on a beam pair corresponding to a TCI codepoint having a lowest index corresponding to the second data transmission.

In Aspect 22, the method of any of Aspects 1 to 21 includes where, where a CORESET is not configured for a CC corresponding to the multiple data transmissions, the first default beam corresponds to a transmission configuration indicator (TCI) codepoint corresponding to a lowest index for the first data transmission, and the second default beam corresponds to a TCI codepoint corresponding to a lowest index for the second data transmission.

In Aspect 23, the method of any of Aspects 1 to 22 includes where the second data transmission is received by using, based on the second data transmission being scheduled to be received after the threshold time, the second beam identified in the control information.

In Aspect 24, the method of any of Aspects 1 to 23 includes where the multiple data transmissions correspond to one or more component carriers (CCs).

In Aspect 25, the method of Aspect 24 includes where one or more data transmissions of the multiple data transmissions correspond to a first CC, and one or more data transmissions of the multiple data transmissions correspond to a second CC.

In Aspect 26, the method of Aspect 25 includes receiving, using one of a third beam identified in the control information or a third default beam, the one or more data transmissions corresponding to the first CC, and receiving, using one of a fourth beam identified in the control information or a fourth default beam, the one or more data transmissions corresponding to the second CC.

In Aspect 27, the method of Aspect 26 includes where the first, second, third, and fourth default beams are the same.

In Aspect 28, the method of any of Aspects 26 or 27 includes where receiving the first data transmission using one of the first beam or the first default beam, receiving at least the second data transmission using one of at least the second beam or the second default beam, receiving the third data transmission using one of the third beam or the third default beam, and receiving at least the fourth data transmission using one of at least the fourth beam or the fourth default beam is based on capability information indicative of a capability to support different beams over different CCs, as indicated to a base station.

In Aspect 29, the method of Aspect 28 includes where the capability information indicates at least one of one or more beams supported over the different CCs, or one or more transmission configuration indicator (TCI) states supported over the different CCs.

In Aspect 30, the method of any of Aspects 25 to 29 includes receiving, using the beam used for receiving the first data transmission, the one or more data transmissions corresponding to the first CC, and receiving, using the beam used for receiving the second data transmission, the one or more data transmissions corresponding to the second CC.

In Aspect 31, the method of Aspect 30 includes where the beam used for receiving the first data transmission is the same as the beam used for receiving the second data transmission.

In Aspect 32, the method of Aspect 31 includes where the first data transmission and the one or more data transmissions corresponding to the first CC are received by using the first default beam based on the first data transmission being scheduled to be received before the threshold time.

In Aspect 33, the method of Aspect 32 includes where the first default beam is based on when the first data transmission is scheduled to be received relative to the threshold time.

In Aspect 34, the method of Aspect 33 includes where the first default beam is further based on a rule.

In Aspect 35, the method of Aspect 34 includes where the rule corresponds to using, to identify the beam used for receiving the first data transmission or the beam used for receiving the second data transmission, at least one of a CC having a lowest identifier, a CC having a smallest tone spacing, or a CC having a latest monitored control resource set.

In Aspect 36, the method of any of Aspects 30 to 35 includes where the beam used for receiving the first data transmission is different from the beam used for receiving the second data transmission.

In Aspect 37, the method of Aspect 36 includes where the beam used for receiving the first data transmission is based on when the first data transmission is scheduled to be received in one of the first CC or the second CC based on a rule, and where the beam used for receiving the second data transmission is based on when the second data transmission is scheduled to be received in one of the first CC or the second CC based on the rule.

In Aspect 38, the method of Aspect 37 includes where the rule corresponds to using, to identify the beam used for receiving the first data transmission or the beam used for receiving the second data transmission, at least one of a CC having a lowest identifier, a CC having a smallest tone spacing, or a CC having a latest monitored control resource set.

In Aspect 39, the method of any of Aspects 1 to 38 includes where receiving the first data transmission using one of the first beam identified in the control information or the first default beam and receiving the second data transmission using one of the first beam identified in the control information, the second beam identified in the control information, or the second default beam is based on a configuration received from a base station.

In Aspect 40, the method of Aspect 39 includes where the configuration indicates whether the first default beam and the second default beam can be different.

In Aspect 41, the method of Aspect 40 includes where the configuration indicates whether the first default beam and the second default beam are different where the first data transmission and the second data transmission are from a single transmission/reception point, the first data transmission and the second data transmissions are scheduled in a single downlink control information (DCI) for receiving over multiple transmission/reception points, or the first data transmission and the second data transmissions are scheduled in multiple DCIs for receiving over multiple transmission/reception points.

In Aspect 42, the method of any of Aspects 1 to 41 includes where receiving the first data transmission using one of the first beam or the first default beam and receiving the second data transmission using one of the first beam identified in the control information, the second beam identified in the control information, or the second default beam is based on capability information transmitted to a base station by the UE.

In Aspect 43, the method of any of Aspects 1 to 42 includes where the first data transmission is an earliest scheduled data transmission among the multiple data transmissions.

In Aspect 44, the method of any of Aspects 1 to 43 includes where the control information is downlink control information (DCI), and where each respective data transmission of the multiple data transmissions corresponds to the DCI.

In Aspect 45, the method of any of Aspects 1 to 44 includes where two or more data transmissions of the multiple data transmissions are scheduled to be received by the UE at the same time.

In Aspect 46, the method of any of Aspects 1 to 45 includes where two or more data transmissions of the multiple data transmissions are scheduled to be received by the UE at different times.

In Aspect 47, the method of any of Aspects 1 to 46 includes where the multiple data transmissions are multiple physical downlink shared channel (PDSCH) data transmissions.

In Aspect 48, the method of any of Aspects 1 to 47 includes where the multiple data transmissions are multiple physical sidelink shared channel (PSSCH) data transmissions.

Aspect 49 is a method of wireless communication performed by a node including transmitting control information that schedules multiple data transmissions to be received by a UE, transmitting a first data transmission of the multiple data transmissions using, based on whether the first data transmission is scheduled to be transmitted before or after a threshold time, one of a first beam identified in the control information or a first default beam, where the threshold time is a time offset from a time at which the control information is transmitted, and transmitting a second data transmission of the multiple data transmissions using one of the first beam identified in the control information, a second beam identified in the control information, or a second default beam.

In Aspect 50, the method of Aspect 49 includes where transmitting the second data transmission using one of the first beam identified in the control information, the second beam identified in the control information, or the second default beam is based on whether the first data transmission is scheduled to be transmitted before or after the threshold time.

In Aspect 51, the method of any of Aspects 49 or 50 includes where the first default beam is based on when the first data transmission is scheduled to be transmitted relative to the threshold time, where the second default beam is the same as the first default beam.

In Aspect 52, the method of any of Aspects 49 to 51 includes where the first default beam is associated with a control resource set (CORESET) identifier, where the second default beam is the same as the first default beam.

In Aspect 53, the method of any of Aspects 49 to 52 includes where the first default beam is associated with a lowest CORESET identifier corresponding to a latest monitored slot scheduled to be transmitted before the first data transmission, where the second default beam is the same as the first default beam.

In Aspect 54, the method of any of Aspects 49 to 53 includes where the control information schedules the multiple data transmissions from multiple transmission/reception points, where the first data transmission and the control information are associated with a CORESET pool, where the first default beam is associated with a first lowest CORESET identifier in the CORESET pool, and where the second default beam is the same as the first default beam.

In Aspect 55, the method of any of Aspects 49 to 54 includes transmitting information that identifies the first default beam and the second default beam.

In Aspect 56, the method of any of Aspects 49 to 55 includes transmitting information that identifies a respective default beam for each respective CORESET identifier associated with the multiple data transmissions.

In Aspect 57, the method of Aspect 56 includes where the first default beam is associated with a first CORESET identifier associated, and where the second default beam is associated with a second CORESET identifier.

In Aspect 58, the method of any of Aspects 49 to 57 includes where the control information schedules the multiple data transmissions from multiple transmission/reception points, and further comprising identifying the first default beam and the second default beam based on a beam pair corresponding to a transmission configuration indicator (TCI) codepoint having a lowest index for the first data transmission, where the second default beam is the same as the first default beam.

In Aspect 59, the method of any of Aspects 49 to 58 includes where, where a CORESET is not configured for a component carrier (CC) corresponding to the multiple data transmissions, the first default beam corresponds to a transmission configuration indicator (TCI) codepoint having a lowest index for the first data transmission, where the second default beam is the same as the first default beam.

In Aspect 60, the method of any of Aspects 49 to 59 includes where transmitting the second data transmission using one of the first beam identified in the control information, the second beam identified in the control information, or the second default beam is based on whether the second data transmission is scheduled to be transmitted before or after the threshold time.

In Aspect 61, the method of any of Aspects 49 to 60 includes transmitting, using the first beam identified in the control information, each respective data transmission of the multiple data transmissions that is scheduled to be transmitted after the threshold time.

In Aspect 62, the method of any of Aspects 49 to 61 includes where the second default beam is the same as the first default beam.

In Aspect 63, the method of Aspect 62 includes transmitting, using the first default beam, each respective data transmission of the multiple data transmissions that is scheduled to be transmitted before the threshold time.

In Aspect 64, the method of any of Aspects 49 to 63 includes transmitting, using the first default beam or the second default beam, each respective data transmission of the multiple data transmissions that is scheduled to be transmitted before the threshold time, where the second default beam is different from the first default beam.

In Aspect 65, the method of any of Aspects 49 to 64 includes where the second default beam is based on when the second data transmission is scheduled to be transmitted relative to the threshold time, where the second default beam is different than the first default beam.

In Aspect 66, the method of any of Aspects 49 to 65 includes where the first default beam is associated with a first lowest CORESET identifier in a first latest monitored slot to be monitored by the UE before the first data transmission is scheduled to be transmitted, and where the second default beam is associated with a second lowest CORESET identifier in a second latest monitored slot monitored by the UE before the second data transmission is scheduled to be transmitted.

In Aspect 67, the method of any of Aspects 49 to 66 includes where the control information schedules the multiple data transmissions from multiple transmission/reception points, where the first data transmission and the control information are associated with a first CORESET pool, where the first default beam is associated with a first lowest CORESET identifier in the CORESET pool in a first latest monitored slot before the first data transmission is scheduled to be transmitted, where the second default beam is associated with a second lowest CORESET identifier in the CORESET pool in a second latest monitored slot before the second data transmission is scheduled to be transmitted.

In Aspect 68, the method of any of Aspects 49 to 67 includes where the first default beam and the second default beam are indicated in a configuration transmitted to the UE that identifies default beams for each of multiple CORESET identifiers.

In Aspect 69, the method of any of Aspects 49 to 68 includes where the control information schedules the multiple data transmissions from multiple transmission/reception points, where the first default beam is based on a beam pair corresponding to a transmission configuration indicator (TCI) codepoint corresponding to a lowest index for the first data transmission, and where the second default beam is based on a beam pair corresponding to a TCI codepoint corresponding to a lowest index for the second data transmission.

In Aspect 70, the method of any of Aspects 49 to 69 includes where, where a CORESET is not configured for a CC corresponding to the multiple data transmissions, the first default beam corresponds to a transmission configuration indicator (TCI) codepoint corresponding to a lowest index for the first data transmission, and the second default beam corresponds to a TCI codepoint corresponding to a lowest index for the second data transmission.

In Aspect 71, the method of any of Aspects 49 to 70 includes where the second data transmission is transmitted by using, based on the second data transmission being scheduled to be transmitted after the threshold time, the second beam identified in the control information.

In Aspect 72, the method of any of Aspects 49 to 71 includes where the multiple data transmissions correspond to one or more component carriers (CCs).

In Aspect 73, the method of Aspect 72 includes where one or more data transmissions of the multiple data transmissions correspond to a first CC, and one or more data transmissions of the multiple data transmissions correspond to a second CC.

In Aspect 74, the method of Aspect 73 includes transmitting, using one of a third beam identified in the control information or a third default beam, the one or more data transmissions corresponding to the first CC, and transmitting, using one of a fourth beam identified in the control information or a fourth default beam, the one or more data transmissions corresponding to the second CC.

In Aspect 75, the method of Aspect 74 includes where the first, second, third, and fourth default beams are the same.

In Aspect 76, the method of any of Aspects 74 or 75 includes where transmitting the first data transmission using one of the first beam or the first default beam, transmitting at least the second data transmission using one of at least the second beam or the second default beam, transmitting the third data transmission using one of the third beam or the third default beam, and transmitting at least the fourth data transmission using one of at least the fourth beam or the fourth default beam is based on capability information indicative of a capability to support different beams over different CCs, as indicated by the UE.

In Aspect 77, the method of Aspect 76 includes where the capability information indicates at least one of one or more beams supported over the different CCs, or one or more transmission configuration indicator (TCI) states supported over the different CCs.

In Aspect 78, the method of any of Aspects 73 to 77 includes transmitting, using the beam used for transmitting the first data transmission, the one or more data transmissions corresponding to the first CC, and transmitting, using the beam used for transmitting the second data transmission, the one or more data transmissions corresponding to the second CC.

In Aspect 79, the method of Aspect 78 includes where the beam used for transmitting the first data transmission is the same as the beam used for transmitting the second data transmission.

In Aspect 80, the method of Aspect 79 includes where the first data transmission and the one or more data transmissions corresponding to the first CC are transmitted by using the first default beam based on the first data transmission being scheduled to be transmitted before the threshold time.

In Aspect 81, the method of Aspect 80 includes where the first default beam is based on when the first data transmission is scheduled to be transmitted relative to the threshold time.

In Aspect 82, the method of Aspect 81 includes where the first default beam is further based on a rule.

In Aspect 83, the method of Aspect 82 includes where the rule corresponds to using, to identify the beam used for transmitting the first data transmission or the beam used for transmitting the second data transmission, at least one of a CC having a lowest identifier, a CC having a smallest tone spacing, or a CC having a latest monitored control resource set.

In Aspect 84, the method of any of Aspects 78 to 83 includes where the beam used for transmitting the first data transmission is different from the beam used for transmitting the second data transmission.

In Aspect 85, the method of Aspect 84 includes where the beam used for transmitting the first data transmission is based on when the first data transmission is scheduled to be transmitted in one of the first CC or the second CC based on a rule, and where the beam used for transmitting the second data transmission is based on when the second data transmission is scheduled to be transmitted in one of the first CC or the second CC based on the rule.

In Aspect 86, the method of any of Aspects 84 or 85 includes where the rule corresponds to using, to identify the beam used for transmitting the first data transmission or the beam used for transmitting the second data transmission, at least one of a CC having a lowest identifier, a CC having a smallest tone spacing, or a CC having a latest monitored control resource set.

In Aspect 87, the method of any of Aspects 49 to 86 includes where transmitting the first data transmission using one of the first beam identified in the control information or the first default beam and transmitting the second data transmission using one of the first beam identified in the control information, the second beam identified in the control information, or the second default beam is based on a configuration transmitted to the UE.

In Aspect 88, the method of Aspect 87 includes where the configuration indicates whether the first default beam and the second default beam can be different.

In Aspect 89, the method of Aspect 88 includes where the configuration indicates whether the first default beam and the second default beam are different where the first data transmission and the second data transmission are from a single transmission/reception point, the first data transmission and the second data transmissions are scheduled in a single downlink control information (DCI) for transmitting over multiple transmission/reception points, or the first data transmission and the second data transmissions are scheduled in multiple DCIs for transmitting over multiple transmission/reception points.

In Aspect 90, the method of any of Aspects 49 to 89 includes where transmitting the first data transmission using one of the first beam or the first default beam and transmitting the second data transmission using one of the first beam identified in the control information, the second beam identified in the control information, or the second default beam is based on capability information received from the UE.

In Aspect 91, the method of any of Aspects 49 to 90 includes where the first data transmission is an earliest scheduled data transmission among the multiple data transmissions.

In Aspect 92, the method of any of Aspects 49 to 91 includes where the control information is downlink control information (DCI), and where each respective data transmission of the multiple data transmissions corresponds to the DCI.

In Aspect 93, the method of any of Aspects 49 to 92 includes where two or more data transmissions of the multiple data transmissions are scheduled to be transmitted to the UE at the same time.

In Aspect 94, the method of any of Aspects 49 to 93 includes where two or more data transmissions of the multiple data transmissions are scheduled to be transmitted to the UE at different times.

In Aspect 95, the method of any of Aspects 49 to 94 includes where the multiple data transmissions are multiple physical downlink shared channel (PDSCH) data transmissions.

In Aspect 96, the method of any of Aspects 49 to 95 includes where the multiple data transmissions are multiple physical sidelink shared channel (PSSCH) data transmissions.

Aspect 97 is a method comprising one or more techniques described in this disclosure.

Aspect 98 is a method comprising any combination of Aspects 1 to 97.

Aspect 99 is an apparatus configured to perform the method of any of Aspects 1 to 98.

In Aspect 100, the apparatus of Aspect 99 includes where the apparatus is a processor, a user equipment, a base station, or a node.

Aspect 101 is an apparatus including a memory, and one or more processors communicatively coupled with the memory, where the one or more processors are configured to perform the method of any of Aspects 1 to 98.

Aspect 102 is an apparatus including one or more means for performing the method of any of Aspects 1 to 98.

In Aspect 103 the apparatus of Aspect 102 includes where the one or more means include one or more processors.

Aspect 104 is a non-transitory computer-readable medium including code stored thereon that, when executed by an apparatus, causes the apparatus to perform the method of any of Aspects 1 to 98.

Aspect 105 is a non-transitory computer-readable medium including code stored thereon that, when executed by a processor of an apparatus, causes the processor of the apparatus to perform the method of any of Aspects 1 to 98.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a memory; and
at least one processor coupled to the memory, wherein the at least one processor is configured to:
receive control information that schedules multiple data transmissions for multiple transmission/reception points;
receive a first data transmission of the multiple data transmissions using, based on whether the first data transmission is scheduled to be received before or after a threshold time, one of a first beam identified in the control information or a first default beam, wherein the threshold time is a time offset from a time at which the control information is received; and
receive a second data transmission of the multiple data transmissions using one of the first beam identified in the control information, a second beam identified in the control information, or a second default beam, wherein a default beam for a respective data transmission is based on a beam pair corresponding to a transmission configuration indicator (TCI) codepoint having a lowest index corresponding to the respective data transmission of the first data transmission or the second data transmission.

2. The apparatus of claim 1, wherein to receive the second data transmission, the at least one processor is configured to receive the second data transmission using one of the first beam identified in the control information, the second beam identified in the control information, or the second default beam based on whether the first data transmission is scheduled to be received before or after the threshold time.

3. The apparatus of claim 1, wherein the first default beam is based on when the first data transmission is scheduled to be received relative to the threshold time, wherein the second default beam is same as the first default beam.

4. The apparatus of claim 1, wherein the first default beam is associated with a control resource set (CORESET) identifier, wherein the second default beam is same as the first default beam.

5. The apparatus of claim 1, wherein the first default beam is associated with a lowest control resource set (CORESET) identifier corresponding to a latest monitored slot scheduled to be received before the first data transmission, wherein the second default beam is same as the first default beam.

6. The apparatus of claim 1, wherein the first data transmission and the control information are associated with a control resource set (CORESET) pool, wherein the first default beam is associated with a first lowest CORESET identifier in the CORESET pool, and wherein the second default beam is same as the first default beam.

7. The apparatus of claim 1, wherein the at least one processor is configured to receive information that identifies the first default beam and the second default beam.

8. The apparatus of claim 1, wherein to receive the second data transmission, the at least one processor is configured to receive information that identifies a respective default beam for each respective control resource set (CORESET) identifier associated with the multiple data transmissions, wherein the first default beam is associated with a first CORESET identifier associated, and wherein the second default beam is associated with a second CORESET identifier.

9. The apparatus of claim 1, wherein the default beam is the first default beam.

10. The apparatus of claim 1, wherein the default beam is the second default beam.

11. The apparatus of claim 1, wherein the control information that schedules the multiple data transmissions is a single downlink control information (DCI).

12. An apparatus for wireless communication, comprising:
a memory; and
at least one processor coupled to the memory, wherein the at least one processor is configured to:
receive control information that schedules multiple data transmissions for multiple transmission/reception points;
identify a first default beam and a second default beam based on a beam pair corresponding to a transmission configuration indicator (TCI) codepoint having a lowest index for the first data transmission, wherein the second default beam is same as the first default beam;
receive a first data transmission of the multiple data transmissions using, based on the first data transmission being scheduled to be received before a threshold time, the first default beam, wherein the threshold time is a time offset from a time at which the control information is received; and
receive a second data transmission of the multiple data transmissions using one of the first beam identified in the control information, a second beam identified in the control information, or the second default beam.

13. The apparatus of claim 1, wherein to receive the second data transmission using one of the first beam identified in the control information, the second beam identified in the control information, or the second default beam, the at least one processor is configured to receive the second data transmission using one of the first beam identified in the control information, the second beam identified in the control information, or the second default beam based on whether the second data transmission is scheduled to be received before or after the threshold time.

14. The apparatus of claim 1, wherein the at least one processor is configured to receive, using the first beam identified in the control information, each respective data transmission of the multiple data transmissions that is scheduled to be received after the threshold time.

15. The apparatus of claim 1, wherein the second default beam is same as the first default beam, wherein the at least one processor is configured to receive, using the first default beam, each respective data transmission of the multiple data transmissions that is scheduled to be received before the threshold time.

16. The apparatus of claim 1, wherein the at least one processor is configured to receive, using the first default beam or the second default beam, each respective data transmission of the multiple data transmissions that is scheduled to be received before the threshold time, wherein the second default beam is different from the first default beam.

17. The apparatus of claim 1, wherein the second default beam is based on when the second data transmission is scheduled to be received relative to the threshold time, wherein the second default beam is different than the first default beam.

18. The apparatus of claim 1, wherein the first default beam is associated with a first lowest control resource set (CORESET) identifier in a first latest monitored slot before the first data transmission is scheduled to be received, and wherein the second default beam is associated with a second lowest CORESET identifier in a second latest monitored slot before the second data transmission is scheduled to be received.

19. The apparatus of claim 1, wherein the first data transmission and the control information are associated with a first control resource set (CORESET) pool, wherein the first default beam is associated with a first lowest CORESET identifier in the CORESET pool in a first latest monitored slot before the first data transmission is scheduled to be received, wherein the second default beam is associated with a second lowest CORESET identifier in the CORESET pool in a second latest monitored slot before the second data transmission is scheduled to be received.

20. The apparatus of claim 12, wherein the control information that schedules the multiple data transmissions is a single downlink control information (DCI).

21. An apparatus for wireless communication, comprising:
a memory; and
at least one processor coupled to the memory, wherein the at least one processor is configured to:
receive control information that schedules multiple data transmissions for multiple transmission/reception points, wherein a first default beam is based on a beam pair corresponding to a transmission configuration indicator (TCI) codepoint having a lowest index;
receive a first data transmission of the multiple data transmissions using, based on the first data transmission being scheduled to be received before a threshold time, the first default beam; and
receive a second data transmission of the multiple data transmissions using one of a first beam identified in the control information, a second beam identified in the control information, or a second default beam.

22. The apparatus of claim 1, wherein the second data transmission is received by using, based on the second data transmission being scheduled to be received after the threshold time, the second beam identified in the control information.

23. The apparatus of claim 1, wherein the multiple data transmissions correspond to one or more component carriers (CCs), wherein one or more first data transmissions of the multiple data transmissions correspond to a first CC of the one or more CCs, and one or more second data transmissions of the multiple data transmissions correspond to a second CC of the one or more CCs.

24. The apparatus of claim 23, wherein the at least one processor is configured to:
receive, using a beam for receiving the first data transmission, the one or more first data transmissions corresponding to the first CC; and
receive, using the beam for receiving the second data transmission, the one or more second data transmissions corresponding to the second CC.

25. The apparatus of claim 24, wherein the beam for receiving the first data transmission is based on when the first data transmission is scheduled to be received in one of the first CC or the second CC based on a rule, and wherein the beam for receiving the second data transmission is based on when the second data transmission is scheduled to be received in one of the first CC or the second CC based on the rule.

26. The apparatus of claim 24, wherein the at least one processor is configured to identify the beam for receiving the first data transmission or the beam for receiving the second data transmission based on a CC having at least one of a lowest identifier, a smallest tone spacing, or a latest monitored control resource set.

27. The apparatus of claim 26, wherein the beam for receiving the first data transmission is different from the beam for receiving the second data transmission.

28. The apparatus of claim 21, wherein the control information that schedules the multiple data transmissions is a single downlink control information (DCI).

* * * * *